(12) United States Patent
Hu et al.

(10) Patent No.: US 7,352,843 B2
(45) Date of Patent: Apr. 1, 2008

(54) COMBINED MOBILE CONTAINER INSPECTION SYSTEM WITH LOW TARGET

(75) Inventors: Haifeng Hu, Beijing (CN); Yucheng Wu, Beijing (CN); Shangmin Sun, Beijing (CN); Zhiqiang Chen, Beijing (CN); Guang Yang, Beijing (CN); Zhengyu Bai, Beijing (CN); Rongxuan Liu, Beijing (CN); Hongliang Yang, Beijing (CN); Jianjun Su, Beijing (CN); Jiantao Wang, Beijing (CN); Yanjun Han, Beijing (CN); Bin Hu, Beijing (CN); Quanwei Song, Beijing (CN); Nan Jiang, Beijing (CN); Hua Peng, Beijing (CN); Jianmin Li, Beijing (CN); Wanquan Shen, Beijing (CN); Zhizhong Liang, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 0 days.

(21) Appl. No.: 10/580,870

(22) PCT Filed: Dec. 2, 2004

(86) PCT No.: PCT/CN2004/001402

§ 371 (c)(1),
(2), (4) Date: May 23, 2006

(87) PCT Pub. No.: WO2005/057196

PCT Pub. Date: Jun. 23, 2005

(65) Prior Publication Data

US 2007/0110215 A1    May 17, 2007

(30) Foreign Application Priority Data

Dec. 10, 2003  (CN)  ........................ 2003 1 0117326

(51) Int. Cl.
*G01N 23/04* (2006.01)

(52) U.S. Cl. ...................................... 378/57; 378/198

(58) Field of Classification Search .................. 378/57, 378/198

See application file for complete search history.

(56) References Cited

U.S. PATENT DOCUMENTS

| 3,565,218 | A  | * | 2/1971 | Franke ........................ 188/290 |
| 6,058,158 | A  | * | 5/2000 | Eiler ............................ 378/57 |
| 6,292,533 | B1 |   | 9/2001 | Swift et al. |
| 6,763,635 | B1 | * | 7/2004 | Lowman ....................... 52/114 |
| 6,920,197 | B2 |   | 7/2005 | Kang et al. |

FOREIGN PATENT DOCUMENTS

| CN | 2403022 | 10/2000 |
| CN | 2410260 | 12/2000 |
| CN | 1401995 | 3/2003 |
| CN | 2572400 | 9/2003 |

\* cited by examiner

Primary Examiner—Jurie Yun
(74) Attorney, Agent, or Firm—Kinney & Lange, PA

(57) ABSTRACT

A combined mobile container inspection system, comprising: a radiation source; a chassis; a rotatable deck provided at an end of the upper surface of said chassis and rotatable with respect to said chassis, provided with a parallelogram bracket formed by a hingedly-connected four-bar linkage mechanism, wherein the cross link of the parallelogram bracket extends to form a horizontal cross arm with detectors, the other end of said horizontal cross arm is connected with a vertical upright arm, which is vertical or parallel to said horizontal cross arm; and a sliding deck provided at the rear end of the rotatable deck and movable upwardly and downwardly, said sliding deck is provided, in turn, with the radiation source, the X-ray therefrom is always right in the face of the detectors provided in the horizontal cross arm and vertical upright arm, calibrator and collimator.

10 Claims, 1 Drawing Sheet

COMBINED MOBILE CONTAINER INSPECTION SYSTEM WITH LOW TARGET

TECHNICAL FIELD

The present invention relates to the field of radiation scan imaging detection technology, especially to a combined mobile container inspection system with low target.

TECHNOLOGY BACKGROUND

Container inspection system is essentially composed by a radiation source generating X-ray of high energy and detector arrays receiving the X-rays penetrating the container. The density distribution of the objects contained in the container is exhibited and obtained by the intensity variation of the X-ray penetrating through the container into the detectors, with the X-ray intensity being converted into grey level of an image, when the container passes the X-ray beams. Conventionally, the container inspection system is divided into a fixed container inspection system, a built-on vehicle movable container inspection system and a combined mobile container inspection system etc. The fixed container inspection system can achieve stable image quality whereas it occupies large area, and the construction cost a lot with a long period, and once built, it must be fixedly used. The built-on vehicle movable container inspection system is typically a vehicle on which all the scanning, detecting and controlling devices are carried, or two vehicle of which one is installed with the scanning and detecting devices, the other with the controlling device to separate human from harmful radiation source, but the detection range is confined due to the vehicle configuration, and the devices adjustment is difficult.

Chinese Patent CN2410260A discloses a "detachable combined mobile container detection device", which adopts a superposition combined structure and dissembles the whole device into detachable parts based upon modular design concept. The device can be transferred from on inspection site to another. It can overcome most disadvantages of the fixed container inspection system mentioned above with stable structure, shortened manufacturing period, reduced construction costs and less area occupation. It also increases the scanning/detecting range, ameliorates the working conditions of the scanning/detecting devices and enhances the reliability and image quality of the device compared with the built-on vehicle movable container inspection system. The inspection device, however, can not inspect the chassis of the vehicle, and is restricted when a vehicle with special height or parking deviation has dead angle. Moreover, site transferring lasts a long time, for example, about four weeks.

Chinese Patent CN2572400A discloses a "built-on movable vehicle container inspection system", which reduces the intensity of the radiation source which is installed under a rotatable deck, and ensures that the vehicle chassis and partial tires can be detected with appropriate adjustment of radiation source angle, increasing scanning range. However, since vehicle chassis is still being used in the system, the device installation adjustment is difficult due to the vehicle structure confinements.

SUMMARY OF THE INVENTION

Accordingly, the present invention has been made to overcome the above mentioned problems, it is an object of the invention to provide a combined mobile container inspection system, with the characteristics of wider scanning range, easy installation, flexibilities of movement, high efficiency, lower cost, high imaging quality.

The foregoing and/or other aspects of the present invention can be achieved by providing a combined mobile container inspection system comprising: a radiation source, a chassis; a rotatable deck provided at an end of the upper surface of said chassis and being rotatable with respect to said chassis, provided with a parallelogram bracket formed by a hingedly-connected four-bar linkage mechanism, wherein the cross link of the parallelogram bracket extends to form a horizontal cross arm with detectors, the other end of said horizontal cross arm is connected with a vertical upright arm, which is vertical or parallel to said horizontal cross arm and a sliding deck provided at the rear end of the rotatable deck and movable upwardly and downwardly, said sliding deck is provided, in turn, with the radiation source the X-ray generated therefrom is always right in the face of the detectors provided in the horizontal cross arm and vertical upright arm, calibrator and collimator.

In the above mentioned technical scheme, an auxiliary bracket of the vertical upright arm is provided on the upper surface of said chassis corresponding to the other end of the rotatable deck when the vertical upright arm is supported parallel to the horizontal cross arm.

In the above mentioned technical scheme, the middle part of the upper surface of the chassis is provided with a device cabin, in which image acquisition module, operation inspection device and modulator cabin are provided.

In the above mentioned technical scheme, the rotatable deck on the upper surface of the chassis rotates 90 degree when the container is inspected, a gantry frame is composed of the parallelogram bracket, horizontal cross arm and vertical upright arm, the sliding deck is moved downwardly which lowers the target point of the ray irradiated from the radiation source, calibrator and collimator to enlarge the scanning range, the control signal is outputted from a remote control device, driving the gantry frame on the upper surface of the chassis to move paralled across the inspected container, the sector formed of the X ray irradiated from the radiation source penetrates through the inspected container at low position and is converted into electrical signal inputting into the image acquisition module in the device cabin after the sector is received by the detectors in the horizontal cross arm and vertical upright arm, the image signal is transferred from the image acquisition module to the operation inspection device and the inspection result is displayed by the display device of the remote control.

In the above mentioned technical scheme, parallelogram bracket may be vertical lifting arm which is used to raise horizontal cross arm and form a gantry frame with horizontal cross arm and vertical upright arm.

In the above mentioned technical scheme, the angle between the chassis and the rotatable deck may not be 90 degree strictly, and this angle can be other value provided there's enough space between the gantry and the scanned container.

In the above mentioned technical scheme, wheels provided with driving device are mounted on the lower surface of said chassis.

In the above mentioned technical scheme, said driving device comprises a motor and a decelerator which are fixed with the lower surface of the chassis, the motor shaft is connected with the decelerator, the output shaft of which is connected with the wheels directly provided on the rail or directly contacting the ground surface.

In the above mentioned technical scheme, said driving device have hydraulic pressure motor which is fixed to the lower surface of the chassis, the output shaft of the hydraulic pressure motor is connected with the wheels directly provided on the rail or directly contacting the ground surface.

In the above mentioned technical scheme, said radiation source is a linear electron accelerator or a radioactive isotope.

In the above mentioned technical scheme, said sliding deck is comprised of a fixed frame and a sliding frame provided with the radiation source, calibrator and collimator. The fixed frame is fixed to the rotatable deck, the both side ends of the inner side of the fixed frame are provided with sliding rail, the sliding frame is embeddedly provided on the sliding rail of fixed frame, a driving mechanism, which moves the sliding frame upwardly and downwardly, is connected between the fixed frame and the sliding frame.

In the above mentioned technical scheme, said driving mechanism is composed of a screw thread pair which comprises a drive screw provided on the fixed frame and a nut fixed within the sliding frame.

In the above mentioned technical scheme, said driving mechanism comprises a hydraulic pressure oil cylinder provided between the fixed frame and the sliding frame.

BRIEF DESCRIPTION OF THE DRAWINGS

The above and/or other aspects and advantages of the present invention will become apparent and more readily appreciated from the following description of the exemplary embodiments, taken in conjunction with the accompany drawings, in which.

DETAILED DESCRIPTION OF THE PREFERRED EMBODIMENT

Figure 1:
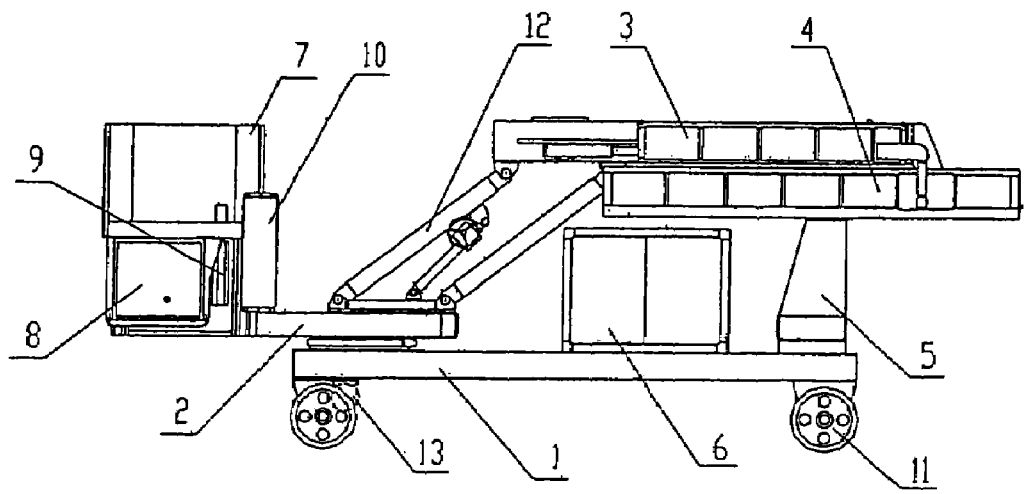
FIG. 1 is a structural schematic view of a combined mobile container inspection system with low target according to the present invention.

Reference will no be made in detail to the embodiments of the present invention, examples of which are illustrated in the accompany drawings, wherein like reference numerals refer to like elements throughout. The embodiments are described below so as to explain the present invention by referring to the figures.

Figure 2:
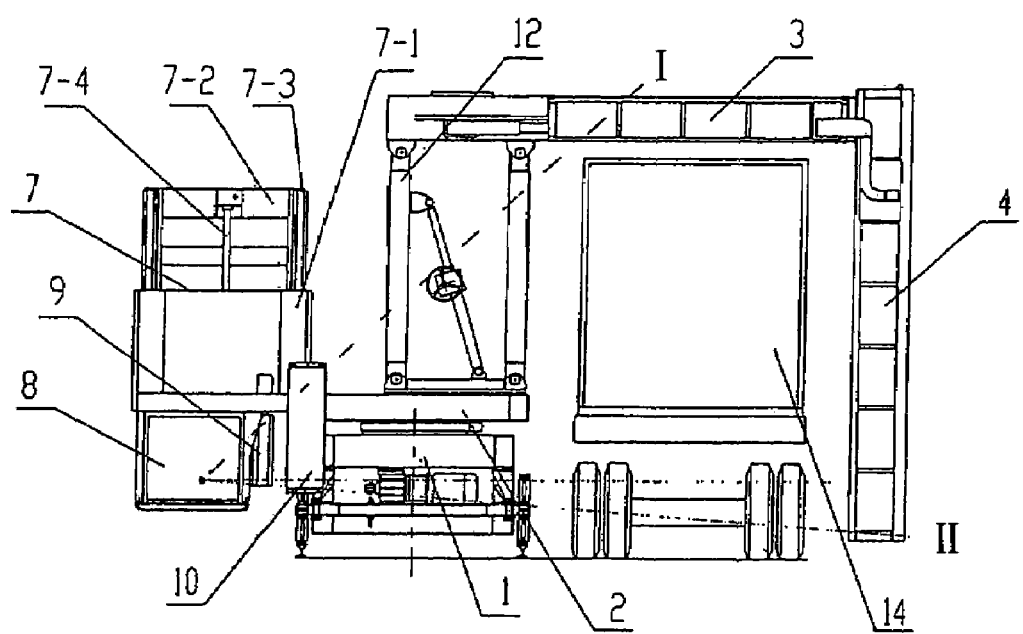
FIG. 2 is a scanning state schematic view of a combined mobile container inspection system with low target according to the present invention.

As shown in FIGS. 1-2, the combined mobile container inspection system with low target according to the present invention comprises a radiation source 8, which can adopt a linear electron accelerator or a radioactive isotope, a chassis 1 and a remote control device. One end of the chassis 1 is provided with a rotatable deck 2, which can moves in opposite direction, the other end thereof is provided with an auxiliary bracket 5 that can support a vertical upright arm 4 when it is parallels to the horizontal cross arm 3. when the vertical upright arm 4 is parallel to the horizontal cross arm 3, the system is in an instable state, and when the system is in a scanning state, the vertical upright arm 4 is perpendicular to the horizontal cross arm 3. The rotatable deck 2 is provided with a parallelogram bracket 12 formed by hingedly-connected four-bar linkage mechanism, a cross link of which is extended as the horizontal cross arm 3 provided with a detector, the other end of the horizontal cross arm 3 is connected with the vertical upright arm 4 provided with a detector via an drawing mechanism which can make the vertical upright arm 4 perpendicular or parallel to the horizontal cross arm 3.

The rear end of the rotatable deck 2 (left end side in the FIG. 1) is provided with a sliding deck 7 which can moves upwardly and downwardly. The sliding deck 7 is provided, in turn, with the radiation source 8, the ray of which is always right in the face of the detectors in the horizontal cross arm 3 and vertical upright arm 4, calibrator 9 and collimator 10. And the sliding deck 7 is composed of a fixed frame 7-2 and a sliding frame 7-1. The fixed frame 7-2 is fixed with the rotatable deck 2, both side ends on the inner side thereof are provided with a sliding rail 7-3. The sliding frame 7-1 is embeddedly provided on the sliding rail 7-3. The fixed frame 7-2 and sliding frame 7-1 are connected by a drive screw on the fixed frame 7-2 and the nut in the sliding frame 7-1 or by a drive mechanism 7-4 composed of a hydraulic pressure cylinder provided between the fixed frame 7-2 and sliding frame 7-1.

The middle part of the upper surface of the chassis 1 is provided with a device cabin 6, in which image acquisition module, operation inspector and modulation cabin are provided. Wheels 11 provided with driving device 13 are mounted under the chassis 1, the driving device can comprise a motor and a decelerator which are fixed with the lower surface of the chassis 1, the motor shaft is connected with the decelerator, the output shaft of which is connected with wheels 11 directly provided on the rail or directly contacting the ground surface. Alternatively, the driving device 13 has a hydraulic pressure motor, which is fixed to the lower surface of the chassis 1, the output shaft of the hydraulic pressure motor is connected with wheels directly provided on the rail or directly contacting the ground surface.

When the container is inspected, the rotatable deck 2 on the upper surface of the chassis 1 rotates 90 degree. And a gantry frame is composed of the parallelogram bracket 12, horizontal cross arm 3 and vertical upright arm 4, therefore, the vertical upright arm 4 is perpendicular to the cross arm 3. The sliding deck 7 is moved downwardly which lowers the target point irradiated from the radiation source 8, calibrator 9 and collimator 10 to enlarge the scanning range. At this time, the control signal is outputted from a remote control device (not shown) to control the driving device, therefore, the chassis 1 is driven to move, driving the gantry frame on the chassis to move paralleledly across the inspected container 11, after the sector formed of the X ray irradiated from the radiation source 8 penetrates through the inspected container with low position and received by the detectors in the horizontal cross arm 3 and vertical upright arm 4, it is converted into electrical signal inputting into the image acquisition module in the device cabin 6, the image acquisition module transfers the image signal to the operation inspector and the inspection result is displayed by the display device of the remote control.

During the usage of the present invention, the remote control device can control the driving device 13, thus driving the wheels 11 to operate, and the chassis 1 and the detecting device provided thereon are moving together, thus the detection of the range of the whole container length is completed. After detection, the remote control device can convert the inspecting system from scanning state to non-work state, i.e., the rotatable deck 2 on the chassis 1 is rotated back to its original position, the gantry frame composed of the parallelogram bracket 12, horizontal cross arm 3 and vertical upright arm 4 furls, and the vertical upright frame 4 is parallel to the horizontal cross frame 3. The present inspecting system can be run on a scan channel or a standard road. The present inspecting system can be dissembled into parts of mechanical module, therefore, it is easy for transportation and installation in another field.

Although preferred embodiments have been described, it would be appreciated by those skilled in the art that the present invention may be made in any other mode without departing from the principles and spirit of the invention.

The invention claimed is:

1. A combined mobile container inspection system, comprising:
   an X-ray radiation source;
   a chassis;
   a rotatable deck provided at an end of an upper surface of said chassis and being rotatable with respect to said chassis, provided with a parallelogram bracket formed by a hingedly-connected four-bar linkage mechanism, wherein a cross link of the parallelogram bracket extends to form a horizontal cross arm with detectors, an end of said horizontal cross arm being connected with a vertical upright arm that has detectors and can be vertical or parallel to said horizontal cross arm, wherein an auxiliary bracket of the vertical upright arm is provided on the upper surface of said chassis corresponding to an end of the rotatable deck when the vertical upright arm is supported parallel to the horizontal cross arm; and
   a sliding deck provided at the rear end of the rotatable deck and movable upwardly and downwardly, said sliding deck is provided, in turn, with the radiation source, the X-ray generated therefrom being in the face of the detectors provided in the horizontal cross arm and vertical upright arm, with a calibrator, and with a collimator,
   wherein said sliding deck is comprised, in two parts, of a fixed frame and a sliding frame provided with the radiation source, calibrator and collimator, the fixed frame is fixed to the rotatable deck, both ends of the inner side of the fixed frame are provided with sliding rail, the sliding frame is embeddedly provided on the sliding rail of the fixed frame, and a driving mechanism, which moves the sliding frame upwardly and downwardly, is connected between the fixed frame and the sliding frame.

2. The combined mobile container inspection system according to claim 1, wherein a middle part of the upper surface of the chassis is provided with a device cabin, in which an image acquisition module, an operation inspection device and a modulator cabin are provided.

3. The combined mobile container inspection system according to claim 2, wherein the rotatable deck on the upper surface of the chassis rotates up to 90 degrees when the container is inspected, and a gantry frame is comprised of the parallelogram bracket, horizontal cross arm and vertical upright arm, the sliding deck is moved downwardly which lowers a target point of rays irradiated from the radiation source, calibrator and collimator to enlarge the scanning range, the control signal is output from a remote control device, driving the gantry frame on the upper surface of the chassis to move parallel across the inspected container, the sector formed of the X ray irradiated from the radiation source penetrates through the inspected container at a low position and is converted into electrical signal input into the image acquisition module in the device cabin after the sector is received by the detectors in the horizontal cross arm and vertical upright arm, the image signal is transferred from the image acquisition module to the operation inspection device and the inspection result is displayed by a display device of the remote control device.

4. The combined mobile container inspection system according to claim 3, wherein the angle between the chassis and the rotatable deck is adjustable up to a maximum angle that is less than 90 degrees.

5. The combined mobile container inspection system according to claim 1, wherein wheels provided with a driving device are mounted on a lower surface of said chassis.

6. The combined mobile container inspection system according to claim 5, wherein said driving device comprises a motor and a decelerator which are fixed with the lower surface of the chassis, and a motor shaft is connected with the decelerator, an output shaft of which is connected with the wheels directly provided on a rail or directly contacting a ground surface.

7. The combined mobile container inspection system according to claim 6, wherein said radiation source is a linear electron accelerator or a radioactive isotope.

8. The combined mobile container inspection system according to claim 5, wherein said driving device has a hydraulic pressure motor which is fixed to the lower surface of the chassis, an output shaft of the hydraulic pressure motor being connected with the wheels directly provided on a rail or directly contacting a ground surface.

9. The combined mobile container inspection system according to claim 1, wherein said driving mechanism is composed of a screw thread pair which comprises a drive screw provided on the fixed frame and a nut fixed within the sliding frame.

10. The combined mobile container inspection system according to claim 1, wherein said driving mechanism comprises a hydraulic pressure oil cylinder provided between the fixed frame and the sliding frame.

* * * * *